3,427,174
HEAT-INITIATED PHOSPHATE-BONDED COMPOSITIONS
Robert E. Miller, Ballwin, Mo., assignor to Monsanto Company, St. Louis, Mo., a corporation of Delaware
No Drawing. Continuation-in-part of application Ser. No. 318,160, Oct. 23, 1963. This application Feb. 14, 1967, Ser. No. 615,885
U.S. Cl. 106—58  15 Claims
Int. Cl. C04b 35/00

ABSTRACT OF THE DISCLOSURE

Heat-initiated phosphate-bonded compositions containing from 25 to 65% by weight of a filler and from 75 to 35% by weight of a metal phosphate containing a mixture of magnesium or aluminum phosphate with barium phosphate in weight ratios of from about 9:6 up to about 9:1 are disclosed. Also disclosed is a process for preparing hydrolytically stable compositions comprising mixing specific proportions of filler, phosphorus pentoxide and metal oxide, compressing the mixture so formed into a molded shape, and applying a heat source to initiate an autocatalytic reaction. Further disclosed is the reactant mixture formed during the process described above.

CROSS REFERENCE TO RELATED APPLICATION

This application is a continuation-in-part of my copending U.S. patent application Ser. No. 318,160, filed Oct. 23, 1963.

BACKGROUND OF THE INVENTION

The field of art to which this invention pertains includes the reactions of phosphorus pentoxide with various metal oxides.

The terminal autocatalytic reaction of phosphorus pentoxide, $P_2O_5$, with most basic oxides is known in the prior art. Depending upon the basic oxide, mere mixing of the two components at room temperature may produce an interaction; usually however, heat must be applied, at which time the exothermic reaction proceeds rapidly and autocatalytically to produce the metal phosphate. With highly reactive metal oxides, a drop of water on the oxide-$P_2O_5$ mixture is sufficient to initiate the reaction; heat produced by hydration of the $P_2O_5$ and metal oxide starts the reaction which then proceeds rapidly to completion. With less reactive oxides, a higher heat source, such as the heated tip of a soldering iron, a match, or a conventional Bunsen burner, is required to initiate the reaction.

Products formed by the above reaction do not have good mechanical properties since the intense heat generated volatilizes some of the $P_2O_5$ prior to reaction and causes the formation of voids, fissures, and laminations in the resultant product. Other mechanical weaknesses are produced by the extreme rapidity of the reaction which permits localized portions of the oxide to remain unreacted, thus creating pockets of powdered material incapable of bearing a load. In addition, even in a carefully controlled and attenuated reaction, the products obtained have poor mechanical properties because of water sensitivity. For these reasons, no effort has previously been successful in utilizing the basic oxide-$P_2O_5$ reaction in the production of structural, load-bearing compositions.

To produce useful, mechanically strong compositions by means of this reaction, at least two major problems must be solved. First the products must be reinforced; secondly, a reactant mixture must be devised that is hydrolytically stable, i.e. not initiated by water, and yet is sufficiently heat-sensitive that it will permit an autocatalytic reaction upon initiation.

SUMMARY

It is an object of this invention to provide heat-initiated, hydrolytically stable, phosphate-bonded compositions having good mechanical properties.

It is a further object of this invention to provide heat-initiated, hydrolytically stable, reinforced alkaline earth metal phosphates or aluminum phosphates.

It is a still further object of this invention to provide a process for the preparation of heat-initiated, hydrolytically stable, phosphate-bonded compositions having good mechanical properties.

It is an additional object of this invention to provide a $P_2O_5$-basic oxide reactant mixture which is hydrolytically stable and which is sufficiently heat-sensitive to produce an autocatalytic reaction in the presence of a diluent.

Additional objects, benefits and advantages will become apparent as the detailed description of the invention proceeds.

This invention relates to heat-initiated, phosphate-bonded compositions. In one aspect, this invention relates to rigid, low density, high strength, hydrolytically stable compositions comprising (a) From 25 to 65% by weight of the total composition of a filler which retains or acquires reinforcing capabilities after exposure to the exothermic heat of a $P_2O_5$-basic oxide reaction; and (b) A metal phosphate bonded to said filler through phosphate bonds, said metal phosphate being present in quantities ranging from 75 to 35% by weight of the total composition, said metal phosphate comprising a mixture of magnesium phosphate or aluminum phosphate with barium phosphate in weight ratios ranging from about 9:6 up to about 9:1.

Another feature of this invention is a process for preparing hydrolytically stable compositions comprising (a) Preparing a reactant mixture capable of heat initiation and incapable of hydrolytic initiation comprising 25 to 65% by weight filler which retains or acquires reinforcing capabilities after exposure to the exothermic heat of the $P_2O_5$-basic oxide reaction, 15 to 25% by weight phosphorus pentoxide, and metal oxide, at least a portion of said metal oxide being selected from the group consisting of magnesium oxide, aluminum oxide or combinations thereof, wherein a maximum of 50% by weight of said metal oxide are alkali metal oxides plus calcium, strontium or barium oxides, and wherein a maximum of 10% by weight of said metal oxides are alkali metal oxides, said metal oxides being present in an amount stoichiometrically equivalent to the amount of phosphorus pentoxide present in said reactant mixture;

(b) Compressing said reactant mixture into a molded shape at pressures ranging from about 1,000 to about 15,000 p.s.i.; and (c) Applying a heat source to said molded shape to initiate an autocatalytic reaction.

Another feature of this invention is a molded shape comprising a reactant mixture capable of heat initiation and incapable of hydrolytic initiation comprising 25 to 65% by weight filler which retains or acquires reinforcing capabilities after exposure to the exothermic heat of the $P_2O_5$-basic oxide reaction, 15 to 25% by weight phosphorus pentoxide and metal oxide, at least a portion of said metal oxide being magnesium oxide, aluminum oxide or combinations thereof, wherein a maximum of 50% by weight of said metal oxides are alkali metal oxides plus calcium, strontium or barium oxides, and wherein a maximum of 10% by weight of said metal oxides are alkali metal oxides, said metal oxides being present in an amount stoichiometrically equivalent to the amount of phosphorus pentoxide present in said reactant mixture.

DESCRIPTION OF THE PREFERRED EMBODIMENTS

Reinforcement of the metal phosphate compositions is achieved by incorporation of a filler into the reactant mixture prior to reaction. Suitable fillers for use herein are those materials which retain or acquire reinforcing capabilities after exposure to the exothermic heat of the $P_2O_5$-basic oxide reaction. Many of the useful filler materials are those used as fillers or reinforcing agents in polymeric compositions. Examples of acceptable reinforcing fillers can be selected from a wide variety of minerals, metals, metal salts such as metal aluminates and metal silicates, other siliceous materials and mixtures thereof. Specific examples include minerals such as wollastonite, spodumene, mica, garnet, hercynite, feldspar, mullite, sillimanite, petalite, kyanite, expanded shale, perlite, forsterite, asbestos such as chrysotile, crocidolite, and other calcium magnesium silicates; quartz and other forms of silica such as fume silica, silica gel, glass fibers, cristobalite, etc.; metals such as aluminum, tin, lead, magnesium, calcium, strontium, barium, titanium, zirconium, vanadium, chromium, manganese, iron, cobalt, nickel, copper and zinc; metal phosphates, sulfides, and sulfates, particularly the heavy metal phosphates, sulfides, and sulfates; clays such as kaolinite, dickite, nacrite, beidellite, bentonite, hectorite, montmorillonite, nontronite, saponite, and attapulgite; and low melting glasses such as lead borate, borosilicate glasses and boric oxide.

As mentioned, one important function of the filler is to provide a reinforcing action in the finished metal phosphate compositions. This reinforcing action may be provided by using fibrous materials such as asbestos. Additionally, the filler may be bonded to the metal phosphate in some greater or lesser degree through phosphate bonds, thereby contributing to the reinforcing action. For instance asbestos, which in some forms is a magnesium silicate, can be united to the metal phosphate matrix through bonds such as

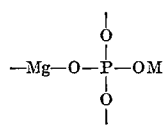

or

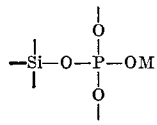

or other configurations. The entire surface area of the filler need not be reacted in this manner nor must each filler particle be reacted in such a manner. The exact mechanism is not fully understood but it is at least likely that some sort of covalent bonds of the above type are formed. Phosphate bonding of filler to metal phosphate may also, or in substitution thereof, include many bonds of an electrostatic nature such as hydrogen bonding. Further, many of the filler particles may be merely entrapped by the metal phosphate matrix and "bonded" simply by close intimate contact of filler with matrix. Whatever the exact nature of the phosphate bonds, the filler is bonded through phosphate bonds to the metal phosphate matrix.

In some compositions, it has been found advantageous to use mixtures of reinforcing fillers to increase the strength and improve hydrolytic stability of the finished compositions. For instance, low melting glass frits, when mixed with feldspar, petalite, mullite, asbestos, wollastonite, etc., provide a flux for the feldspar or similar materials during reaction, and upon cooling form a waterproof ceramic bond between the particles of filler.

A property of reinforcing fillers which has an effect upon the speed of reaction is the particle size and size distribution insofar as it affects the compactness of the pressure-molded reactant mixture. That is, an excessively compact reactant mixture does not permit satisfactory propagation of the exotherm, hence does not produce a strongly bonded product. There is, of course, a wide range of particle sizes and size distributions which, when coupled with moderate molding pressures, will provide satisfactory reactant mixtures. Aggregate particles as large as one centimeter in diameter or larger are satisfactory for use in this invention when combined with other smaller particles in the 2.5 to 200 mesh range. At the other extreme, a large proportion, e.g. 50% or more, of particles smaller than 200 mesh has not been as suitable as a mixture containing only 15% particles in the 200 to +325 mesh range. Representative particle size distributions of reinforcing fillers are set forth in the examples, but it is not my intent to limit the invention to these figures since other distributions having both larger and smaller particles will perform equally well.

Another property of suitable reinforcing fillers useful herein is their capability to retain or acquire reinforcing characteristics when exposed to the exothermic heat of the $P_2O_5$-metal oxide reaction. Reinforcing characteristics or capability of a filler, as used herein, refer to the capability of a filler to provide a metal phosphate composition having a flexural, tensile or compressive strength or modulus higher than the same mechanical property possessed by the corresponding unfilled metal phosphate composition. Many suitable fillers perform satisfactorily because of their high melting points. That is, many suitable fillers are refractory-like in nature and remain virtually unmodified at temperatures of 1000° or 1500° C. Mullite and garnet are examples of such materials. Other suitable fillers are melted and perhaps substantially modified by temperatures of 1000° C. As explained below, low melting glasses can act as a flux and, upon cooling of the fired composition, solidify to form an acceptable filler material. Unsatisfactory for use herein are materials which will be decomposed or altered in some manner so as to permanently lose their reinforcing capability. Such examples include rayon fibers and the like. Of course, there are organic materials such as certain high temperature resins which are satisfactory for use herein, provided they meet the above criterion of retaining or acquiring a reinforcing capability.

The amount of reinforcing filler to be used in the preparation of compositions of this invention varies over a wide range with the maximum and minimum contents being limited by the exotherm of the reaction. With regard to the maximum concentration of reinforcing filler, there must be sufficient $P_2O_5$ and metal oxide present that the reaction, once initiated, will proceed autocatalytically to completion. In the presence of excess filler, the dilution of reactants prevents such a reaction. I have found that the maximum concentration of filler permissible in the compositions is 65% by weight, and preferably 60% by weight. Compositions containing a 65% concentration of reinforcing agent mentioned as a maximum limit can be prepared in usable form preferably if at least a small fraction of the reinforcing agent consists of a low melting glass to act as a flux. Without such a flux material, the maximum filler content is preferably around 55% by weight. With regard to the minimum concentration of reinforcing filler, some latitude is permissible, depending upon the mechanical properties desired in the product and upon the particular metal oxide used as a reactant. There must be sufficient filler present to dilute the reactants so that a smooth reaction is produced, thereby preventing the formation of objectionable voids, fissures, and laminations in the product. A certain amount of filler is also necessary to improve mechanical properties of the compositions so that they will be useful in the areas subsequently set forth. I have found that the minimum amount of filler is about 25% by weight, preferably 40% by weight, of the total composition.

Particularly preferred compositions contain a metal phosphate matrix having certain specific proportions of magnesium or aluminum phosphate or mixtures thereof with barium phosphate. Proportions of the phosphates which result in preferred compositions range from a weight ratio of 9 parts of aluminum or magnesium phosphate or mixtures thereof:6 parts of barium phosphate up to a ratio of 9 parts of aluminum or magnesium phosphate or mixtures thereof:1 part of barium phoshate.

Bonding of the reinforcing filler is accomplished by the reacted metal phosphate. There are several metal phosphates which can be used to bind the filler. But to produce compositions with satisfactory mechanical and physical properties by the process of this invention, it is necessary that at least a portion of the phosphates consist of either an alkaline earth metal phosphate or an aluminum phosphate.

The process of this invention comprises thoroughly mixing a filler, phosphorus pentoxide, and one or more basic metal oxides, at least a portion of which is an alkali earth metal oxide or aluminum oxide, compressing this mixture under moderate conditions, e.g. about 1,000 to about 15,000 p.s.i., to form a molded object, and initiating the reaction by applying a heat source to the molded reaction mixture.

The phosphorus pentoxide is an essential component of the process and its concentration in the reactant mixture is a critical feature of this invention. Below 15% by weight $P_2O_5$, a reactant mixture having the proper metal oxides cannot be autocatalytically reacted upon heat-initiation. Above 25% by weight $P_2O_5$, the reacted compositions are water-sensitive, i.e. the compositions lose mechanical strength, and eventually flake and crumble, when immersed in water or exposed to atmospheric humidity. As a result, concentrations of $P_2O_5$ in the reactant mixture range from about 15 to about 25% by weight, preferably from about 18 to about 24% by weight.

The metal oxides are another reactant in my novel process. As mentioned above, many basic oxides will react autocatalytically with $P_2O_5$ to produce a metal phosphate. But what is desired is a metal oxide which, when mixed with $P_2O_5$, will provide a hydrolytically stable mixture which can still be heat-initiated to produce an autocatalytic reaction, wherein the product of such a reaction has water-resistant characteristics. To achieve the desired features of the reactant mixture and the final product, the reactant mixture can contain only a small amount, i.e. less than 10% by weight of the total metal oxide, of the alkali metal oxides. Preferably any alkali metal oxides will be present in an amount less than 1% by weight of the total metal oxides. Examples of alkali metal oxides are lithium, sodium and potassium oxides. The alkaline earth metal oxides and other oxides less basic than the alkali metal oxides are more suitable for use in the practice of this invention. However, products from the reaction of calcium, strontium or barium oxide with $P_2O_5$ in the presence of a reinforcing agent do not have the desired feature of hydrolytic stability. Further, a reactant mixture of calcium oxide and $P_2O_5$ is water-sensitive, even at high concentrations of filler. The same is true of reactant mixtures containing strontium oxide or barium oxide—water sensitivity is a problem, both in the reactant mixture and in the final product. On the other hand, a mixture of a less basic oxide with $P_2O_5$, although hydrolytically stable, does not consistently produce a strong finished product by a heat-initiated autocatalytic reaction. A mixture of a major proportion of magnesium oxide or aluminum oxide, i.e. 50% or more by weight, with a minor amount of alkaline earth metal oxides, i.e. 50% or less by weight, when reacted with $P_2O_5$ produces the compositions of this invention. However, compositions containing no calcium, strontium, or barium oxides are also included within the scope of this invention. Magnesium oxide or aluminum oxide mixed with calcium, strontium, and/or barium oxides in ratios ranging from 9:6 up to 9:1 are preferred in the practice of this invention. Particularly preferred are mixtures of magnesium oxide or aluminum oxide with barium oxide in a ratio of approximately 3:1. Examples of other metal oxides which can be substituted in place of, or used in combination with magnesium oxide or aluminum oxide include oxides of boron, titanium, iron, copper and zinc.

The lower limit of quantities of metal oxide in the reactant mixture is dependent upon the amount of $P_2O_5$ present. In the complete reaction of the two components, an amount of metal oxide stoichiometrically equivalent to the amount of $P_2O_5$ is required. To insure complete and rapid reaction of the $P_2O_5$, it is usually desirable to include a molar excess of the metal oxide, preferably at least a 10% molar excess. The upper limit of metal oxide content in the reactant mixture need not be accurately defined since the unreacted excess functions as a filler or reinforcing agent in the final composition. Generally, a molar ratio of metal oxide to $P_2O_5$ in excess of 4:1 is not used since the metal oxides are not as efficient reinforcing fillers as other previously mentioned materials.

Molded or shaped reinforced objects can be prepared according to this process by preforming the loosely powdered or granulated reactant mixture into the desired shape prior to heat initiation. This is easily accomplished by pressing the reactant mixture into a desired shape. Pressures in the range from less than 1,000 to more than 15,000 p.s.i. are satisfactory with pressures from about 2,000 to about 14,000 p.s.i. being preferred. Preforming of such shapes is desirable in many instances since it reduces voids and laminations in the final product, thus producing a stronger material with more reproducible properties.

Another process variable which broadens the scope of reactants and fillers and ultimately the final products, is the exothermic heat of reaction. A method of reducing or attenuating the exotherm by the addition of a diluent to the reactant mixture, which also functions as a reinforcing filler and contributes to hydrolytic stability in the final product, has already been discussed. In some cases, however, it may be desirable to increase the exotherm while still maintaining a high degree of reinforcement and hydrolytic stability in the final product. For instance, by using a large amount, e.g. 60% by weight, of wollastonite and quartz as a reinforcing agent, the exotherm of the oxide-$P_2O_5$ reaction is not sufficiently large to maximize the effect of phosphate bonds among the particles of filler. If the exotherm can be increased, there is sufficient phosphate formed to bond the particles of filler very tightly, thus producing a strong, rigid composition. Addition of amounts of finely divided metallic aluminum or magnesium is suitable for increasing the exotherm of the reaction. As an example, 1.5% aluminum powder can cause an increase in the temperature of the interior of a preformed reactant mixture during reaction from around 800° C. to more than 1500° C. This feature, in combination with means for reducing the exotherm by the use of various amounts of diluent, provides a method for accurate control of the exothermic heat of reaction, thereby aiding in the production of strongly bonded compositions with a minimum of voids, fissures, and laminations.

The compositions and process of this invention will be more fully understood from the detailed description of the following specific examples which set forth some of the preferred compositions, the methods of preparing them, and the excellent mechanical and physical properties attained by the practice of this invention. Percentages of components are expressed in weight percent except as otherwise specifically noted.

Example 1

A mixture was prepared having the following proportions of components:

| | Grams |
|---|---|
| Magnesium oxide (22.8%) | 204 |
| Barium oxide (11.9%) | 106 |

|  | Grams |
|---|---|
| Phosphorus pentoxide (22.2%) | 198 |
| Lead borate (18.1%) | 180 |
| Calcium silicate (23.0%) | 206 |

The particle size distribution of the calcium silicate was as follows:

| Percent | Mesh |
|---|---|
| 100 | <10 |
| 78 | <20 |
| 47 | <35 |
| 15 | <100 |
| 2 | <325 |

From the above reactant mixture several preformed moldings were made at various pressures. The powdered reactant mixture and preformed moldings resisted atmospheric moisture sufficiently to provide adequate working time between the mixing of components and heat initiation. Reaction of the moldings was initiated with a small flame. The reactions proceeded smoothly, producing hard, unlaminated objects. Density of the finished products was 95 to 105 pounds per cubic foot. Compressive strength at 2% deformation of samples preformed at 2,000 p.s.i. was 1485 p.s.i. Flexural strength of samples preformed at 6,000 p.s.i. was 700 p.s.i.; flexural modulus was $7.5 \times 10^5$ p.s.i. When the above flexural moldings were subjected to a two hour boil in water, they exhibited a 19% gain in weight. Samples preformed at 14,000 p.s.i. were subjected to a two hour boil in water prior to testing. Flexural strength was 1,080 p.s.i.; flexural modulus was $15.7 \times 10^5$ p.s.i.; gain in weight of these samples after boiling was 12%.

Flexural properties were determined according to ASTM test D 790–61; compressive strength was determined according to ASTM test D 1621–59T.

Example 2

A mixture was prepared having the following proportions of components:

|  | Grams |
|---|---|
| Magnesium oxide | 141 |
| Phosphorus pentoxide | 130 |
| Vitreous silica | 67 |
| Flint quartz | 83 |

The particle size distribution of the reinforcing agent was as follows:

| Mesh | Percent |
|---|---|
| 10, silica | 5 |
| 16, silica | 10 |
| 50, silica | 15 |
| 60, quartz | 35 |
| 100, quartz | 20 |
| 200, silica | 10 |
| 325, silica | 5 |

Preformed moldings pressed at 2,000 and 4,000 p.s.i. were prepared. The reaction was initiated with a Bunsen burner flame. The exotherm traveled slowly through the moldings, producing compositions of poor strength and modulus.

To 359 grams of the above mixture, 73 grams of barium oxide was added. After thorough blending, moldings were made 2,000 p.s.i. The moldings were initiated with a small flame, whereupon the exotherm traveled rapidly through the moldings, producing hard unlaminated objects. Density of the finished product was 96 lbs./cu. ft.; compressive strength at 2% deformation was 1,750 p.s.i.; flexural strength was 390 p.s.i.; flexural modulus was $8.8 \times 10^5$ p.s.i.

The compositions described above are useful as structural components. Their mechanical and physical properties plus low density permit their use in applications wherein expanded shale concretes and prefoamed concretes have been used. The method of preparation of the compositions of this invention which includes preforming under pressure and heat initiation gives them a decided advantage over other concretes which require large amounts of water, long curing cycles, and in the case of preformed concrete, heating at elevated temperatures for sustained periods of time.

Compositions prepared according to the process described herein can be glazed or surface-coated with a variety of materials. A polyester prepolymer-peroxide catalyst mixture has been applied to the surface of a preformed molding and polymerized by the exotherm of the reaction, thereby forming a plastic surface finish on the phosphate-bonded composition. Similar experiments have been carried out with low melting glasses and porcelain mixes to produce surface glazes.

The exotherm of the $P_2O_5$-basic oxide reaction has also been used to cure thermosetting adhesives, thereby bonding the inventive compositions directly to wood, steel, and both polyester and nylon objects. Consequently, a $P_2O_5$-metal oxide-reinforcing agent reactant mixture can be used as a component in a jointing or sealing composition for certain heavy-duty applications such as are found in the construction industry.

Although the invention has been described in terms of specified embodiments which are set forth in detail, it should be understood that this was done for illustrative purposes only, and that the invention is not necessarily limited thereto since alternative embodiments and operating techniques will become apparent to those skilled in the art in view of this disclosure. For instance, it has previously been stated that magnesium oxide or aluminum oxide when reacted with $P_2O_5$ in the presence of a diluting filler do not consistently produce an autocatalytic reaction resulting in strong, hard finished objects. It has also been mentioned that the exotherm of the $P_2O_5$-basic oxide reaction can be increased by reducing the proportion of diluting filler and by adding small amounts of finely divided metallic magnesium or aluminum to the reactant mixture. By utilizing either, and preferably both of these techniques, it is possible to produce compositions using as the only basic oxide magnesium oxide or aluminum oxide.

Another variation in the oxide content of the reactant mixture is also possible. It has been mentioned that the ratio of magnesium oxide to other alkaline earth metal oxide should preferably be no less than 9:6 to avoid excessive water sensitivity. It has also been mentioned that the inclusion of large amounts of low-melting glasses as reinforcing agents improves hydrolytic stability. Compositions within this invention can be prepared wherein the reinforcing agent can be so compounded that magnesium oxide-alkali earth metal oxide ratios of 1:1 or 2:3 will also produce preferred compositions.

Accordingly, these and other modifications are contemplated which can be made without departing from the spirit of the described invention.

What is claimed is:
1. A hydrolytically stable composition comprising:
   (a) from 25 to 65% by weight of the total composition of a reinforcing filler; and
   (b) a metal phosphate bonded to said filler through phosphate bonds, said metal phosphate being present in quantities ranging from 75% to 35% by weight of the total composition, said metal phosphate comprising a mixture of a substance selected from the group consisting of magnesium phosphate, aluminum phosphate and mixtures thereof with barium phosphate in weight ratios ranging from about 9:6 up to about 9:1.

2. A composition according to claim 1 wherein said metal phosphate comprises a mixture of aluminum phosphate with barium phosphate in weight ratios ranging from about 9:6 up to about 9:1.

3. A composition according to claim 1 wherein said metal phosphate comprises a mixture of magnesium phosphate with barium phosphate in weight ratios ranging from about 9:6 up to about 9:1.

4. A process for preparing hydrolytically stable phosphate-bonded compositions comprising
  (a) preparing a reactant mixture capable of heat initiation and incapable of hydrolytic initiation comprising 25 to 65% by weight of a reinforcing filler, 15 to 25% by weight phosphorus pentoxide, and metal oxide, at least 50% by weight of said metal oxide being a substance selected from the group consisting of magnesium oxide, aluminum oxide and combinations thereof, up to 50% by weight of said metal oxide are substances selected from the group consisting of alkali metal oxides, calcium oxide, strontium oxide, barium oxide and combinations thereof and up to 10% by weight of said metal oxide are alkali metal oxides, said metal oxide being present in an amount at least stoichiometrically equivalent to the amount of phosphorus pentoxide present in said reactant mixture;
  (b) compressing said reactant mixture into a molded shape at pressures ranging from about 1,000 to about 15,000 p.s.i.; and
  (c) applying a heat source to said molded shape to initiate an autocatalytic reaction.

5. A process according to claim 4 wherein said reactant mixture additionally contains up to about 1.5% by weight of finely divided metallic magnesium or aluminum.

6. A process of preparing hydrolytically stable phosphate-bonded compositions comprising:
  (a) preparing a reactant mixture capable of heat initiation and incapable of hydrolytic initiation comprising 25 to 65% by weight of a reinforcing filler 15 to 25% by weight phosphorus pentoxide, and metal oxide, a major portion of said metal oxide being a substance selected from the group consisting of magnesium oxide, aluminum oxide and combination thereof, and a minor portion of said metal oxide being a substance selected from the group consisting of alkali metal oxides, calcium oxide, strontium oxide, barium oxide and combination thereof, wherein said alkali metal oxides, if present, constitute a maximum of 10% by weight of said metal oxide, said metal oxide being present in an amount at least stoichiometrically equivalent to the amount of phosphorus pentoxide present in said reactant mixture;
  (b) compressing said reactant mixture into a molded shape at pressures ranging from about 1,000 to about 15,000 p.s.i.; and
  (c) applying a heat source to said molded shape to initiate an autocatalytic reaction.

7. A process according to claim 6 wherein said filler is present in the reactant mixture in an amount ranging from about 40 to about 60% by weight of the total mixture and wherein said phosphorus pentoxide is present in an amount ranging from about 18 to about 24% by weight of the total mixture.

8. A process according to claim 6 wherein a major portion of said metal oxide is magnesium oxide.

9. A process according to claim 6 wherein a major portion of said metal oxide is aluminum oxide.

10. A process according to claim 6 wherein said metal oxide comprises a mixture of magnesium oxide and barium oxide in ratios ranging from about 9:6 up to about 9:1.

11. A process according to claim 6 wherein said metal oxide comprises a mixture of aluminum oxide and barium oxide in ratios ranging from about 9:6 up to about 9:1.

12. A process according to claim 6 wherein said reactant mixture additionally contains up to about 1.5% by weight of a finely divided metallic substance selected from the group consisting of magnesium and aluminum.

13. As an article of manufacture, a molded shape comprising a reactant mixture capable of a substance selected from the group consisting of heat initiation to form phosphate bonds and incapable of hydrolytic initiation comprising 25 to 65% by weight reinforcing filler, 15 to 25% by weight phosphorus pentoxide, and metal oxide, at least 50% by weight of said metal oxide being a substance selected from the group consisting of magnesium oxide, aluminum oxide and combinations thereof, up to 50% by weight of said metal oxide being a substance selected from the group consisting of alkali metal oxides, calcium oxide, strontium oxide, barium oxide and combinations thereof, up to 10% by weight of said metal oxide are alkali metal oxides, said metal oxide being present in an amount at least stoichiometrically equivalent to the amount of phosphorus pentoxide present in said reactant mixture.

14. An article of manufacture according to claim 13 wherein said metal oxide consists solely of magnesium oxide, aluminum oxide and combination thereof in combination with up to 1.5% by weight based on the total molded shape of finely divided metallic magnesium or aluminum.

15. As an article of manufacture, a molded shape comprising a reactant mixture capable of heat initiation to form phosphate bonds and incapable of hydrolytic initiation comprising 25 to 65% by weight reinforcing filler, 15 to 25% by weight phosphorus pentoxide, and metal oxide, a major portion of said metal oxide being a substance selected from the group consisting of magnesium oxide, aluminum oxide and combination thereof, and a minor portion of said metal oxide being a substance selected from the group consisting of alkali metal oxides, calcium oixde, strontium oxide, barium oxide and combinations thereof, wherein said alkali metal oxides, if present, constitute a maximum of 10% by weight of said metal oxide, said metal oxide being present in an amount at least stoichiometrically equivalent to the amount of phosphorus pentoxide present in said reactant mixture.

References Cited
UNITED STATES PATENTS

| | | | |
|---|---|---|---|
| 2,687,967 | 8/1954 | Yedlick et al. | 106—63 |
| 2,866,714 | 12/1958 | Svikis | 106—65 |

JAMES E. POER, *Primary Examiner.*

U.S. Cl. X.R.
106—62, 63, 65, 69